(12) United States Patent
Rehling et al.

(10) Patent No.: US 8,463,595 B1
(45) Date of Patent: Jun. 11, 2013

(54) DETAILED SENTIMENT ANALYSIS

(75) Inventors: John Andrew Rehling, San Francisco, CA (US); Thomas Gerardo Dignan, Mountain View, CA (US)

(73) Assignee: Reputation.com, Inc., Redwood City, CA (US)

( * ) Notice: Subject to any disclaimer, the term of this patent is extended or adjusted under 35 U.S.C. 154(b) by 7 days.

(21) Appl. No.: 13/536,710

(22) Filed: Jun. 28, 2012

Related U.S. Application Data

(63) Continuation of application No. 13/436,206, filed on Mar. 30, 2012.

(60) Provisional application No. 61/607,466, filed on Mar. 6, 2012.

(51) Int. Cl.
*G06F 17/30867* (2012.01)

(52) U.S. Cl.
USPC .................................. 704/9; 706/50; 707/737

(58) Field of Classification Search
CPC ................................................ G06F 17/30867
USPC ................................ 704/9; 706/50; 707/737
See application file for complete search history.

(56) References Cited

U.S. PATENT DOCUMENTS

| | | | | |
|---|---|---|---|---|
| 7,130,777 | B2 * | 10/2006 | Garg et al. | 703/2 |
| 7,600,017 | B2 * | 10/2009 | Holtzman et al. | 709/224 |
| 7,813,986 | B2 * | 10/2010 | Gardner et al. | 705/36 R |
| 8,135,669 | B2 * | 3/2012 | Olstad et al. | 707/608 |
| 8,352,405 | B2 * | 1/2013 | Fang et al. | 706/50 |
| 2008/0306899 | A1 * | 12/2008 | Gregory et al. | 707/1 |
| 2012/0197950 | A1 * | 8/2012 | Dayal et al. | 707/822 |

\* cited by examiner

*Primary Examiner* — Susan McFadden
(74) *Attorney, Agent, or Firm* — Van Pelt, Yi & James LLP

(57) ABSTRACT

Performing detailed sentiment analysis includes generating a first sentiment score for a first entity based on a content source. The first sentiment score is generated with respect to a first dimension. A second sentiment score for the first entity is generated based on the content source. The second sentiment score is generated with respect to a second dimension.

20 Claims, 13 Drawing Sheets

Please classify the text in one or more of the dimensions.

| | | Negative | Neutral | Positive |
|---|---|:---:|:---:|:---:|
| After his Olympic career ended, due to a knee injury, Mr. Smith went on to found a popular charitable organization helping school children learn to read. | Business | ○ | ● | ○ |
| | Ethical | ○ | ○ | ● |
| | Health | ● | ○ | ○ |
| | Legal | ○ | ● | ○ |
| | Personal | ○ | ○ | ● |
| | Vice | ○ | ○ | ● |

FIG. 6A

If the text expresses a positive sentiment in a given dimension, click the "+" sign. If it is negative, click the "-" sign. If you're not sure, or if it is neutral, don't click either sign.

| All-star running back #JohnSmith appeared in court today on domestic abuse charges. | Ethical | + | - |
|---|---|:---:|:---:|
| | Customer Service | + | - |
| | Vice | + | - |

FIG. 6B

Classify the text in one or more of the dimensions. If you're not sure, leave it blank.

| | | Very Neg. | Neg. | Neutral | Pos. | Very Pos. |
|---|---|:---:|:---:|:---:|:---:|:---:|
| A torrential downpour couldn't keep down the spirits of fans at the premiere of the fantastic new version of Robin Hood. | Weather | ○ | ○ | ○ | ○ | ○ |
| | Value | ○ | ○ | ○ | ○ | ○ |
| | Health | ○ | ○ | ○ | ○ | ○ |
| | Legal | ○ | ○ | ○ | ○ | ○ |
| | Quality | ○ | ○ | ○ | ○ | ○ |
| | Vice | ○ | ○ | ○ | ○ | ○ |

FIG. 6C

| Feature | Dimension | Negative | Neutral | Positive |
|---|---|---|---|---|
| knee injury | Health | -7.25 | -15.56 | -10.71 |
| a successful | Business | -11.72 | -11.20 | -8.73 |
| Charity | Ethical | -10.28 | -11.53 | -7.03 |
| Bankruptcy | Business | -7.78 | -10.87 | -9.87 |
| be sentence to | Legal | -6.86 | -15.40 | |
| Olympic champion | Health | -10.90 | -10.80 | -9.83 |
| Unemployed | Business | -7.94 | -10.49 | -12.21 |
| Profitable | Business | -8.72 | -12.31 | -8.55 |
| Illegal | Legal | -7.74 | -11.34 | |
| The | Personal | -10.58 | -10.43 | -10.51 |

FIG. 7

| Feature | Dimension | Negative | Neutral | Positive |
|---|---|---|---|---|
| david | Business | -10.36 | -10.37 | -10.11 |
| be | Business | -10.34 | -10.36 | -10.16 |
| a | Business | -10.25 | -10.35 | -10.19 |
| successful | Business | -10.49 | -11.16 | -8.77 |
| man | Business | -11.92 | -10.25 | -10.88 |
| be a | Business | -10.34 | -10.36 | -10.16 |
| a successful | Business | -11.72 | -11.20 | -8.73 |
| TOTAL | | -75.42 | -74.05 | -69.00 |

FIG. 8

| Feature | Dimension | Negative | Neutral | Positive |
|---|---|---|---|---|
| . | Ethical | -10.67 | -10.69 | -10.62 |
| arrest | Ethical | -7.71 | -10.96 | -13.25 |
| arrest for | Ethical | -7.45 | -11.11 | -10.12 |
| be | Ethical | -10.63 | -10.69 | -10.66 |
| be arrest | Ethical | -7.35 | -11.12 | -12.84 |
| be arrest for | Ethical | -7.45 | -11.11 | -10.12 |
| do | Ethical | -10.52 | -10.70 | -10.28 |
| do the | Ethical | -13.34 | -10.73 | -9.15 |
| do the right | Ethical | -10.28 | -11.37 | -7.17 |
| for | Ethical | -10.81 | -10.70 | -10.18 |
| i | Ethical | -11.31 | -10.68 | -10.75 |
| i be | Ethical | -11.11 | -10.69 | -10.33 |
| right | Ethical | -10.82 | -10.72 | -9.51 |
| right thing | Ethical | -10.67 | -11.09 | -7.55 |
| the | Ethical | -10.74 | -10.69 | -10.64 |
| the right | Ethical | -10.54 | -10.73 | -9.42 |
| the right thing | Ethical | -10.67 | -11.09 | -7.55 |
| thing | Ethical | -10.19 | -10.72 | -9.86 |
| thing . | Ethical | -12.45 | -10.72 | -9.34 |
| TOTAL | | -194.71 | -206.31 | -189.34 |

FIG. 9

| Feature | Dimension | Negative | Neutral | Positive |
|---|---|---|---|---|
| . | Health | -10.73 | -10.79 | -10.73 |
| arrest | Health | -10.26 | -10.80 | -13.22 |
| arrest for | Health | -11.83 | -10.77 | -10.50 |
| be | Health | -10.50 | -10.80 | -10.92 |
| be arrest | Health | -9.97 | -10.82 | -12.75 |
| be arrest for | Health | -11.56 | -10.78 | -10.22 |
| do | Health | -10.98 | -10.78 | -11.49 |
| do the | Health | -11.89 | -10.77 | -10.55 |
| do the right | Health | -11.56 | -10.78 | -10.22 |
| for | Health | -11.06 | -10.78 | -10.81 |
| for do | Health | -11.56 | -10.78 | -10.22 |
| i | Health | -11.32 | -10.77 | -11.16 |
| i be | Health | -11.35 | -10.77 | -11.60 |
| right | Health | -10.46 | -10.80 | -10.76 |
| right thing | Health | -11.83 | -10.77 | -10.50 |
| right thing . | Health | -11.17 | -10.79 | -9.83 |
| the | Health | -10.84 | -10.79 | -10.74 |
| the right | Health | -12.22 | -10.77 | -10.23 |
| the right thing | Health | -11.83 | -10.77 | -10.50 |
| thing | Health | -11.39 | -10.77 | -11.41 |
| thing . | Health | -10.95 | -10.78 | -12.18 |
| TOTAL | | -235.26 | -226.43 | -230.54 |

FIG. 10

| Feature | Dimension | Negative | Neutral |
|---|---|---|---|
| . | Legal | -10.78 | -10.83 |
| arrest | Legal | -7.00 | -12.79 |
| arrest for | Legal | -7.05 | -12.53 |
| be | Legal | -10.55 | -10.84 |
| be arrest | Legal | -6.92 | -13.51 |
| be arrest for | Legal | -7.16 | -12.14 |
| do | Legal | -11.08 | -10.83 |
| do the | Legal | -11.47 | -10.82 |
| do the right | Legal | -10.59 | -10.84 |
| for | Legal | -10.69 | -10.84 |
| for do | Legal | -10.76 | -10.83 |
| i | Legal | -11.98 | -10.82 |
| i be | Legal | -11.54 | -10.82 |
| right | Legal | -11.89 | -10.82 |
| right thing | Legal | -10.91 | -10.83 |
| right thing . | Legal | -10.11 | -10.85 |
| the | Legal | -10.89 | -10.83 |
| the right | Legal | -14.07 | -10.81 |
| the right thing | Legal | -10.91 | -10.83 |
| thing | Legal | -11.16 | -10.83 |
| thing . | Legal | -12.72 | -10.82 |
| TOTAL | | -220.23 | -235.06 |

FIG. 11

|  | Malfunction | Value | Politeness |
|---|---|---|---|
| Doctor-HMO | No | No | Yes |
| Restaurant | No | Yes | Yes |
| New Auto dealer | Yes | Yes | Yes |
| Auto Repair | No | Yes | Yes |
| Retail Website | Yes | Yes | No |

DETAILED SENTIMENT ANALYSIS

CROSS REFERENCE TO OTHER APPLICATIONS

This application is a continuation of co-pending U.S. patent application Ser. No. 13/436,206 entitled DETAILED SENTIMENT ANALYSIS filed Mar. 30, 2012, which claims priority to U.S. Provisional Patent Application No. 61/607,466 entitled DETAILED SENTIMENT ANALYSIS filed Mar. 6, 2012 both of which are incorporated herein by reference for all purposes.

BACKGROUND OF THE INVENTION

Sentiment analysis techniques can be used to assign a piece of text a single value that represents opinion expressed in that text. For example, on a scale between −1 (very negative) and +1 (very positive), the text: "Bob is a terrible trumpet player" might be assigned a score of −0.9 using sentiment analysis. As another example, the text: "Those cookies taste great!" might be assigned a score of +0.9.

One problem with existing sentiment analysis techniques is seen when the text being evaluated expresses two independent opinions, such as in the following: "Bob is a terrible trumpet player, but the cookies he bakes taste great!" Using existing techniques, the text would be assigned a neutral score—the negative and positive opinions expressed cancelling one another out. For this and other reasons, improvements in sentiment analysis techniques would be desirable.

BRIEF DESCRIPTION OF THE DRAWINGS

Various embodiments of the invention are disclosed in the following detailed description and the accompanying drawings.

FIG. 6A illustrates an embodiment of an interface for annotating text.

FIG. 6B illustrates an embodiment of an interface for annotating text.

FIG. 6C illustrates an embodiment of an interface for annotating text.

FIG. 7 illustrates an example of a feature-value table.

FIG. 8 illustrates an example of a feature-value table.

FIG. 9 illustrates an example of a feature-value table.

FIG. 10 illustrates an example of a feature-value table.

FIG. 11 illustrates an example of a feature-value table.

FIG. 12 illustrates a chart of business types and whether various dimensions are likely to be of interest to the business types.

DETAILED DESCRIPTION

Figure 1:
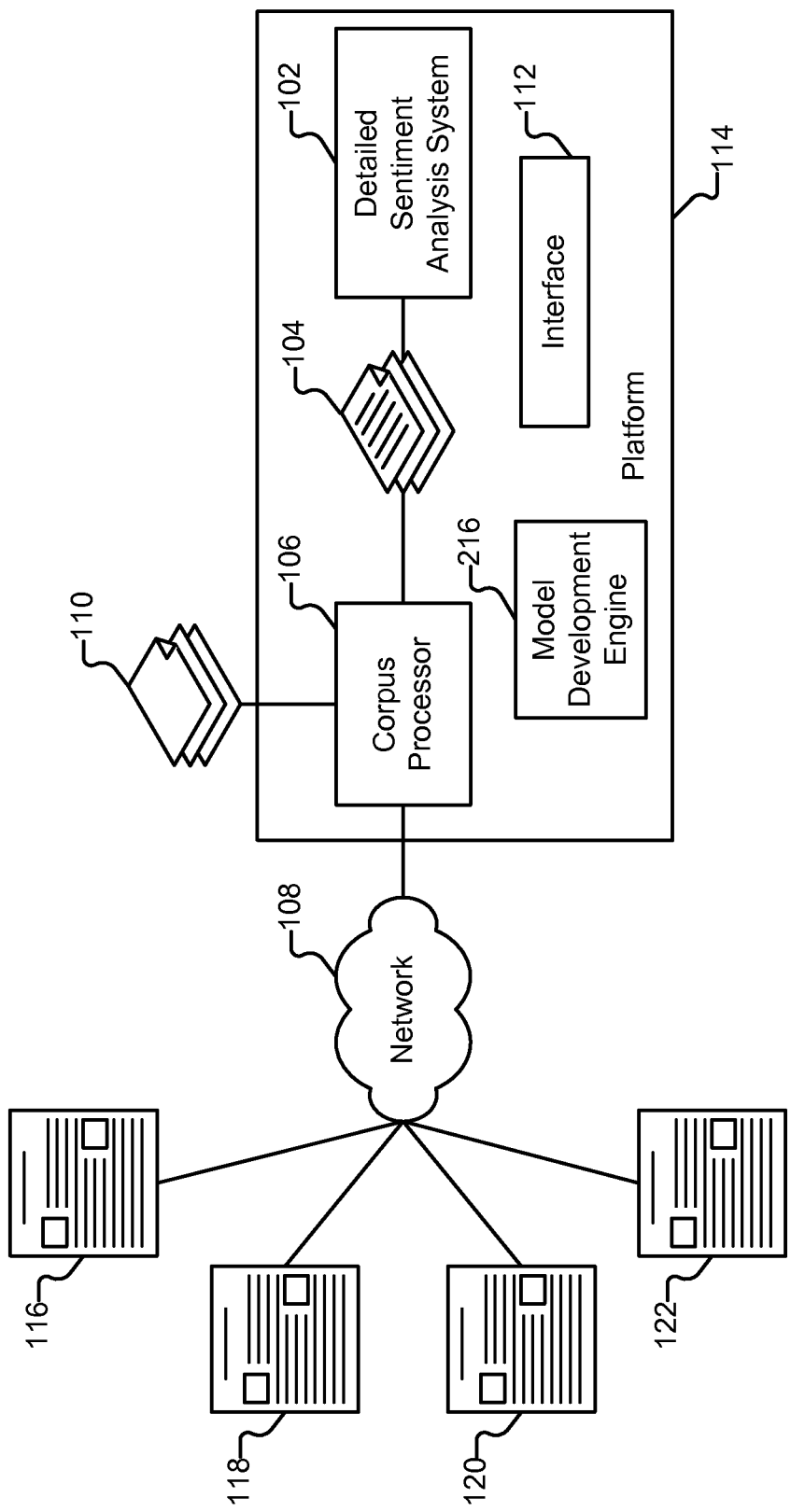
FIG. 1 illustrates an example of an environment in which detailed sentiment analysis is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are "detailed sentiment analysis" techniques for summarizing subjective or affective opinions in text across multiple dimensions. Examples of dimensions include the following: "Business" (the status of a person's career or financial holdings); "Ethics" (a person's moral character or ethical nature of his/her behavior); "Health" (a person's state of physical or mental health); "Legal" (a person's legal standing, particularly regarding the existence of criminal charges); "Personal" (a person's relationships with his/her friends and family); "Vice" (a person's activities which may cause him/her to be judged negatively by others). Additional dimensions are discussed in more detail below.

As one example of detailed sentiment analysis, suppose an input text is the following newspaper headline: "Highly acclaimed surgeon John Smith was arrested last night in a prostitution sting." Also suppose that the four dimensions in which the detailed sentiment analysis is performed include "Business," "Legal," "Vice," and "Malfunction." The latter dimension describes a product's sturdiness/build quality. The presence in the text of the phrase "highly acclaimed surgeon" would lead to a positive sentiment score (also referred to herein as a "sentiment label") being assigned in the Business dimension. The presence of the terms "arrested" and "sting" would lead to a negative sentiment score being assigned in the Legal dimension. The presence of the terms "prostitution" and "sting" would lead to a negative sentiment score being assigned in the Vice dimension. Finally, the lack of terms (whether positive or negative) associated with product or other malfunctions (e.g., "broken" or "fixed") would lead to a neutral sentiment score being assigned in the Malfunction dimension. In some embodiments, threshold confidence scores are applied when determining whether to assign a label of any kind for a given dimension. Thus, in the case of the "Malfunction" dimension, rather than assigning a neutral label, no label might be assigned, and mention of the malfunction dimension omitted from output regarding the text.

As will be described in more detail below, in some embodiments an input text is evaluated across all available dimensions. In other embodiments, only a subset of dimensions is used in the analysis.

FIG. 1 illustrates an example of an environment in which detailed sentiment analysis is performed. Corpus processor 106 is configured to collect (or otherwise receive) documents from a variety of data sources 116-122. Examples of such documents include news articles, forum messages, product and business reviews, social networking updates, blog posts, and any other text (in formats such as HTML, TXT, PDF, etc.) as applicable. As used herein, "document" is used to refer to both a complete document (e.g., an entire news article) and any applicable subset of that document (e.g., a sentence, a paragraph, or other portion) used in training or analysis.

Data source 116 is a social networking site; data source 118 is a site that allows users to review businesses; data source 120 is an online newspaper; and data source 122 is a search engine website. Other data sources can also be used in conjunction with the techniques described herein, as applicable. Corpus processor 106 is configured to scrape content from external websites 116-120 and to perform searches using an API made available by search engine website 122, all of which are accessible via a network 108 (e.g., the Internet). Corpus processor 106 is also configured to receive documents from an internal source, such as repository 110.

In various embodiments, corpus processor 106 collects documents on demand. For example, a user of platform 114 can initiate a request (via interface 112) for documents that pertain to him (or any other appropriate entity, such as business or a product). In response to the request, corpus processor 106 obtains documents from one or more of the data sources 116-122 (and/or repository 110). Corpus processor 106 can also be configured to store and periodically refresh the documents it collects, such as upon the request of a user, or programmatically (e.g., once a month). The user can also upload documents for analysis to platform 114 for analysis, rather than relying on external sources 116-122.

Corpus processor 106 is configured to process the collected documents and make them available to detailed sentiment analysis system 102 as an input data set (104). As one example, in some embodiments corpus processor 106 is configured to convert the documents it receives into plaintext, or otherwise extract text from those documents, as applicable. As will be described in more detail below, detailed sentiment analysis system 102 is configured to determine a set of sentiment scores (used to assign "sentiment labels") for the documents it receives, across a plurality of dimensions. Platform 114 can also include additional elements, such as model development engine 216, which will be described in more detail below. Model development engine 216 can also be included within detailed sentiment analysis system 102 or can be omitted, as applicable.

Figure 2:
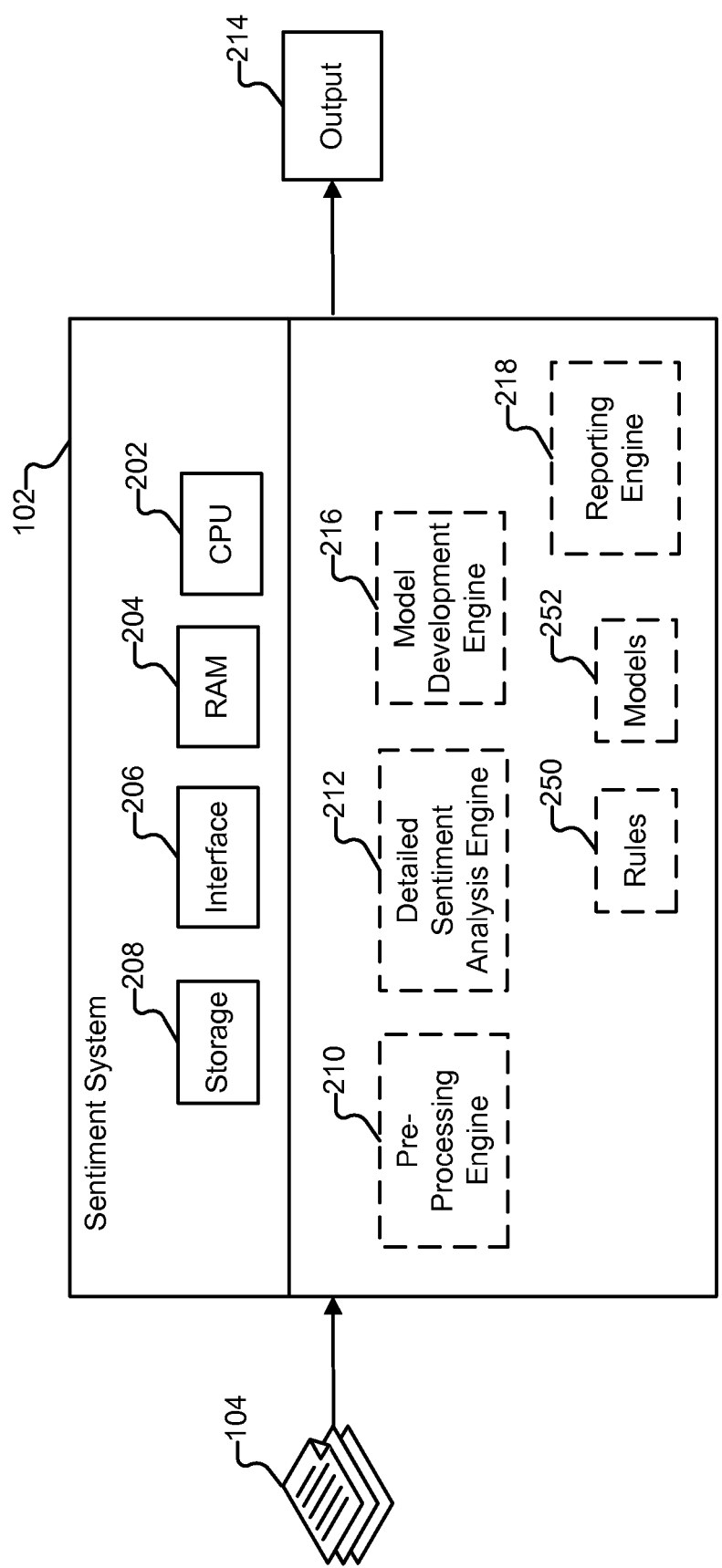
FIG. 2 illustrates an embodiment of a detailed sentiment analysis system.

FIG. 2 illustrates an embodiment of a detailed sentiment analysis system. In the example shown in FIG. 2, system 102 comprises standard commercially available server hardware (e.g., having a multi-core processor 202, 8G+ of RAM 204, gigabit network interface adaptor(s) 206, and hard drive(s) 208) running a typical server-class operating system (e.g., Linux). In various embodiments, system 102 is implemented across a scalable infrastructure comprising multiple such servers, solid state drives, and/or other applicable high-performance hardware. Further, as illustrated in FIG. 1, detailed sentiment analysis system 102 can be collocated on a platform 114 with other components, such as corpus processor 106. System 102 can also be configured to work with one or more third party elements. As one example, the functionality of corpus processor 106 can be provided by one or more third parties. As another example, model development engine 216 can work in conjunction with a third party crowdsourcing Internet marketplace such as Amazon Mechanical Turk.

Whenever system 102 is described as performing a task, either a single component or a subset of components or all components of system 102 may cooperate to perform the task. Similarly, whenever a component of system 102 is described as performing a task, a subcomponent may perform the task and/or the component may perform the task in conjunction with other components. In various embodiments, portions of system 102 are provided by one or more separate devices. For example, the functionality of preprocessing engine 210 and detailed sentiment analysis engine 212 may be provided by two different devices, rather than the functionality being provided by a single device. Also, in various embodiments, system 102 provides the functionality of corpus processor 106 and a separate corpus processor is omitted, as applicable. Additional detail regarding various aspects of platform 114 is provided below.

Figure 3:
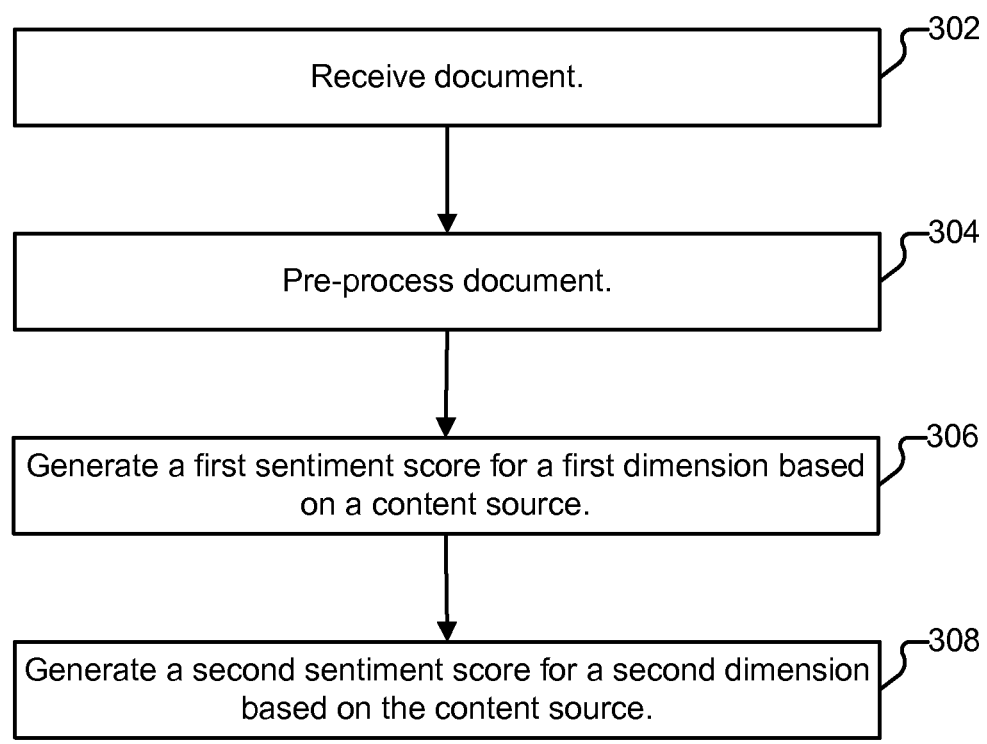
FIG. 3 illustrates an embodiment of a process for performing detailed sentiment analysis.

FIG. 3 illustrates an embodiment of a process for performing detailed sentiment analysis. In various embodiments the process shown in FIG. 3 is performed by detailed sentiment analysis system 102. The process begins at 302 when a document is received. As one example, suppose a user of the system (hereinafter "Alice") represents an automobile manufacturer, Acme Motors. Alice has directed corpus processor 106 to obtain reviews of Acme dealers submitted to review site 118. Corpus processor 106 retrieves the reviews and provides one or more of them as input 104 to detailed sentiment analysis system 102 at 302.

At 304, the input received at 302 is preprocessed, such as by pre-processing engine 210. In some embodiments the pre-processing engine performs tokenization using stemming. Other pre-processing techniques can also be used, as applicable, and in some embodiments pre-processing is omitted.

At 306, a first sentiment score is generated for a first dimension. As one example, at 306, a sentiment score for a "Customer Service" dimension is determined. A variety of techniques can be used to determine the score. For example, in some embodiments engine 212 (also referred to as "classifier 212") is configured to score the document in accordance with a set of rules 250 created for each dimension by a linguist. In other embodiments, engine 212 is configured to score the document in accordance with a set of models 252 for each dimension developed using machine learning techniques. The models 252 can be provided by a third party and can also be created within system 102 by model development engine 216. In some embodiments a combination of both rules and models are used to score documents. Additional detail regarding techniques for building a classifier and for determining sentiment scores are provided below.

At 308, a second sentiment score is generated for a second dimension. As one example, at 308, a sentiment score for the "malfunction" dimension is determined at 308. In some embodiments, the first and second score are combined into an aggregate score, e.g., by adding the two scores together.

Figure 4:
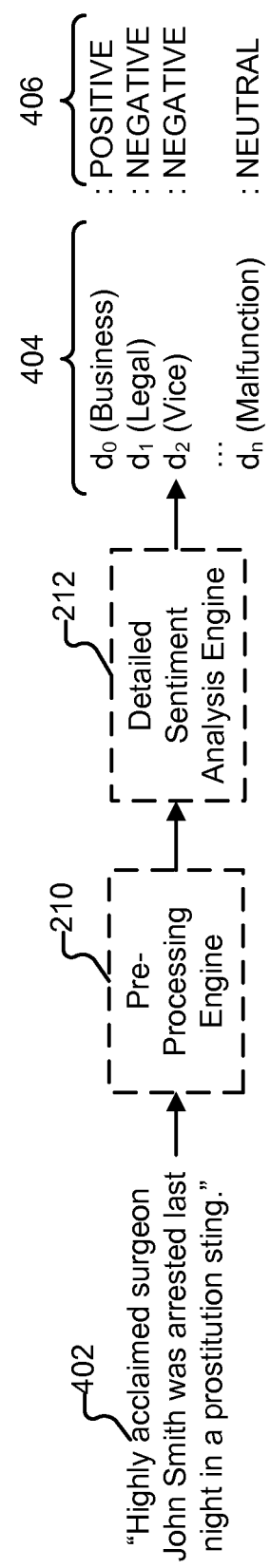
FIG. 4 is a conceptual illustration of processing performed on a document.

FIG. 4 is a conceptual illustration of processing performed on a document. Document 402 (the headline regarding the arrest of John Smith discussed above) is received as input by system 102. Pre-processing engine 210 tokenizes the document and provides its output to detailed sentiment analysis engine 212. Engine 212 performs sentiment analysis for the document across n dimensions (404). In the example shown, output 214 (406) is provided as one of three nominal values (i.e., a "positive" label with respect to dimension $d_0$, the "business" dimension). In various embodiments, the output takes other forms, such as a binary classification (i.e., "positive" or "negative"), a fine grained numerical scale, or one of several distinct values.

Building a Classifier

As mentioned above, two different approaches for building a classifier include machine learning approaches and rule-based approaches.

Machine Learning Approach

Figure 5:
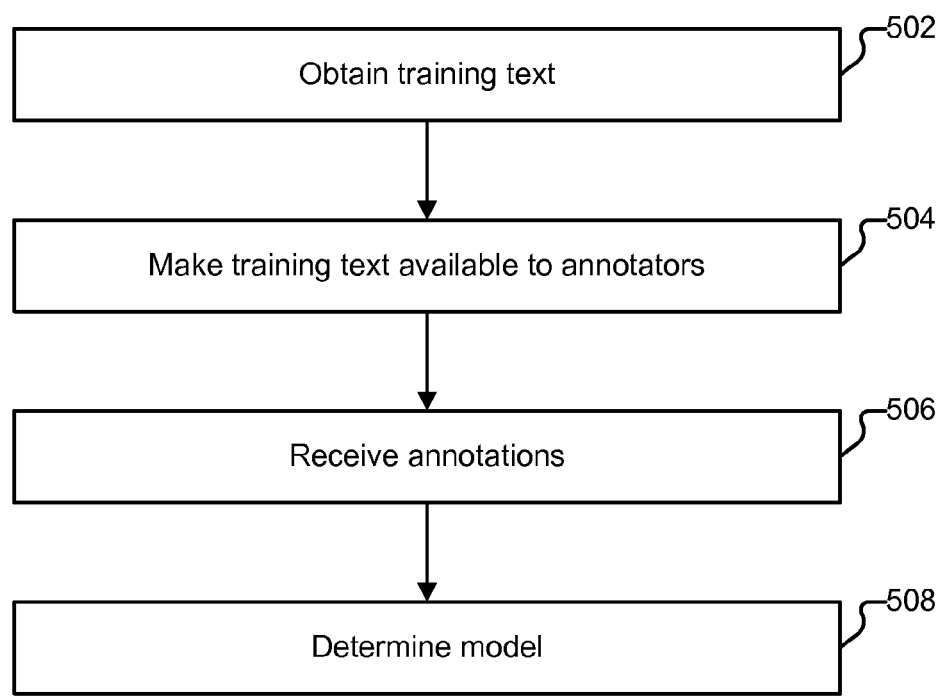
FIG. 5 illustrates an embodiment of a process for training a model.

In a machine learning approach, models are built by training on examples. FIG. 5 illustrates an embodiment of a process for training a model. In various embodiments the process shown in FIG. 5 is performed by model development engine 216. The process begins at 502 when training text is obtained. One example of training text is a set of short pieces of text (e.g., "Don is a good father," "The service at Acme Motors is terrible," etc.). At 504, the training text is made available to annotators. As examples, the training text is made available in interfaces such as are shown in FIGS. 6A-6C. Annotators are asked to classify the training text in various dimensions. In the example shown in FIG. 6A, annotators are asked to check radio buttons that indicate dimensional sentiment. In the example shown in FIG. 6B, annotators are asked to click on icons that indicate dimensional sentiment. The text being used for classification in FIG. 6B is a "tweet" that includes a "hashtag." In the example shown in FIG. 6C, annotators are asked to rate dimensional sentiment using a Likert item. The annotations are received at 506. In some embodiments, services such as Amazon's Mechanical Turk are used to obtain training data. For example, 50,000 training texts are provided to workers who classify the texts in various dimensions through interfaces such as are shown in FIGS. 6A-6C.

At 508, the annotation-training text pairs are used to create statistical models. Different methodologies can be used to make models of varying complexity. As one example, if the Naïve Bayes classifier variant of machine learning is used, the model is a table of probabilities mapping each feature (short sequences of stemmed words) to the probability of a sentiment label (i.e., "positive" or "negative" sentiment) being appropriate for the text. In some embodiments, the features are chosen from n-grams of between one and three words in length.

An example feature-value table is depicted in FIG. 7. In table 700, the numbers in columns 702-706 are derived from the probability of a document relating to a given sentiment given an instance of that feature in the document. In table 700, the values are always negative. For each feature, relatively less likely sentiment labels are indicated with lower numbers and relatively more likely sentiment labels are indicated with higher numbers.

At classification time (i.e., when process 300 is performed), the document received at 302 is coded into features the same way that text is coded during training. Each feature in the document is used to retrieve values from the model. The document's sentiment label with respect to a given dimension is a function of the values retrieved from the model for that document. For example, each possible label (e.g., "positive" or "negative") is assigned a score. The label with the highest score (and/or, in some embodiments, with the highest estimated probability or probability exceeding a threshold) is assigned. Additional information regarding the deployment of machine learning models is provided below.

Rule-Based Approach

A classifier can also be built using a rule-based approach. A rule can operate in any arbitrary way that conditions which evaluate to true or false can be defined. One way to build a rule-based classifier is to use word lists and define the appropriate output if any of the words on the list are found in the input document. For example, a generic classifier built on three rules and two short lists of features could be as follows:

BAD WORDS={bad, awful, terrible}
GOOD WORDS={good, excellent}
Rule 1: If a text contains any word in BAD WORDS, the Sentiment is Negative.
Rule 2: If a text contains any word in GOOD WORDS, the Sentiment is Positive.
Rule 3: Otherwise, the Sentiment is Neutral.

Different rules can be defined for different dimensions. The following are example features and rules for "Malfunction," "Value," and "Politeness" dimensions, respectively:

Example: "Malfunction" Dimension Features and Rules
MALFUNCTION VERBS={break, crack, rip, rupture, smash, crush, bust}
FUNCTION WORDS={work, correctly}
NEGATION WORDS={not, no, never, doesn't, can't}
MALFUNCTION RULE: If the sentence has a MALFUNCTION VERB or the sentence has a FUNCTION WORD and a NEGATION WORD, then the Malfunction Sentiment is Negative. Otherwise, the Malfunction Sentiment is Neutral.

Example: "Value" Dimension Features and Rules
GOOD VALUE ADJECTIVES={cheap, affordable}
BAD VALUE ADJECTIVES={expensive, unaffordable}
VALUE RULE: If the sentence has a BAD VALUE ADJECTIVE, then the Value Sentiment is Negative. Otherwise, if the sentence has a GOOD VALUE ADJECTIVE, then the Value Sentiment is Positive. Otherwise, the Value Sentiment is Neutral.

Example "Politeness" Dimension Features and Rules
POLITE ADJECTIVES={nice, friendly, helpful, considerate}
IMPOLITE ADJECTIVES={rude, unfriendly, unhelpful, inconsiderate}
POLITE VERBS={smile, help}
POLITENESS RULE: If the sentence has an IMPOLITENESS ADJECTIVE, then the Politeness Sentiment is Negative. Otherwise, if the sentence has a POLITE VERB or a POLITE ADJECTIVE, then the Politeness Sentiment is Positive. Otherwise, the Politeness Sentiment is Neutral.

Deploying the Classifier

Machine Learning Approach

As explained in conjunction with process 300, at 304 a document input to detailed sentiment analysis system 102 for analysis is pre-processed. In the following example, during pre-processing, tokens are stemmed to the dictionary form of the word, surface forms are normalized, and noun plurals, verb tense, and adjective comparatives and superlatives are eliminated. For example, the document "The brown dog chased the black cat" is broken into the following 17 features (using n-grams of length one to three): {the, brown, dog, chase, black, cat, the brown, brown dog, dog chase, chase the, the black, black cat, the brown dog, brown dog chase, dog chase the, chase the black, the black cat}.

When a document is classified, each feature virtually votes for possible output sentiment labels by adding the value for that feature-label pair from the model to a running total for each label. Thus, the score, w, for any sentiment label, c, can be derived by the sum of the weights associating each feature to that sentiment label:

$w_c(\text{document}) = \Sigma_f w_{c,f}$

In some embodiments, the sentiment label with the highest total after all feature-values in the document have been summed is the output for the dimension for the document. In some embodiments, the sentiment label is only output if a confidence probability exceeds a threshold, as described in more detail below.

Many features, including very common words such as "the" will have nearly equal values for positive and negative sentiment and the neutral value with either be on par with the positive and negative values or dominate them. This means that the feature carries very little total vote to influence the choice of output. To illustrate this, the word "the" is included in table 700 (708). "The" is ubiquitous in the English language and occurs in the majority of all long English texts and in a large proportion of short ones. It occurs in documents of all sentiment values for all dimensions almost equally. As such, adding its value in the computation of a document's sentiment has almost no effect: it adds almost the same quantity to each of the sentiment labels, and it is therefore very unlikely to be decisive in determining the final output.

At the other extreme, the feature "be sentence to" ("sentence" is the stemmed version of "sentenced") shows in the Legal Sentiment dimension a negative value that is 8.54 higher than the neutral value (710). When a document contains this feature, the feature votes very aggressively for a negative Legal Sentiment classification. It will in many cases cast the decisive votes for such a classification but will fail to do so in cases where the sum of the neutral votes exceed the negative votes by more than 8.54.

In some embodiments, the scores are converted to estimated probabilities for each sentiment label being correct as follows:

$$p_c(\text{document}) = \frac{e^{w_c}}{\sum_i e^{w_i}},$$

where $p_c$ is the estimated probability of the class represented by the label c being correct classification of the text; $w_n$ is the weight, assigned during training time, to represent the strength of the association between feature n and class c; and, e represents the base of the natural logarithm.

Example Analysis in Business Dimension: "David is a Successful Man."

Suppose the document to be analyzed is "David is a successful man" and the analysis is currently being performed with respect to the Business dimension. Also suppose that seven n-grams from the document have values in the model (depicted in FIG. 8). N-grams which occur rarely or never in the training text are not present in the table. Also included in the table are the values for each of the features and the resulting totals. The totals for each column indicate the values used to directly determine the output sentiment label. The highest value, −69.00 (802), is for the positive label, so that is the output for this document in the Business dimension. The three totals can be converted to estimated probabilities using the probability formula provided above. In this example, $p_{negative}$=0.21; $p_{neutral}$=0.26; and $p_{positive}$=0.53.

Example Analysis in Ethical, Health, and Legal Dimensions: "I was Arrested for Doing the Right Thing."

Suppose the document to be analyzed is "I was arrested for doing the right thing." Feature-value pairs with respect to the n-grams in the document across three different dimensions (Ethical, Health, and Legal) are depicted in FIGS. 9-11, respectively. The feature extraction scheme represented in this example allows punctuation tokens as well as word tokens to be part of an n-gram. Allowing punctuation marks to serve as tokens may in some cases convey useful information about the context in which the word tokens making up the rest of the n-gram are found.

FIG. 9 depicts the n-grams of the document that have values in the Ethical Sentiment model. The probabilities for each of the three classifications are $p_{negative}$=0.35; $p_{neutral}$=0.19; and $p_{positive}$=0.46. While many features from the document are present in the Ethical Sentiment model, the final decision of a positive output comes almost entirely from four features, all of which include the stemmed token "arrest" corresponding to the word "arrested" in the document. While the fact that a single word can count multiple times might seem like a flaw, with overlapping n-grams as the features, the opportunity is available to each word, and is not a bias.

Cumulatively, the "arrest" features contribute over 16.37 points more to the positive Ethical sentiment label than to the negative Ethical sentiment label. This is counteracted by votes for the positive label, especially from features containing "right," and also from features containing the word "thing." This may appear surprising, as the word "thing" may seem to be neutral. However, the way in which it is used in context can lead to associations which are statistically correct. In this case, it yields the correct answer, as the final score for positive is 5.4 points higher than the score for negative, so in the Ethical dimension, the document is rated, correctly, as positive. The probability is estimated as less than 50%; this indicates a low confidence in the applicability of the Ethical dimension to the document, but Ethical positive is the best response if an answer is required.

FIG. 10 depicts the n-grams of the document that have values in the Health Sentiment model. The probabilities for each of the three classifications are $p_{negative}$=0.27; $p_{neutral}$=0.40; and $p_{positive}$=0.33. In the Health dimension, few features derived from the document vote strongly for either the positive or negative label. The scores for neutral are notably almost uniform for each feature while scores for positive and negative vary from one feature to another, but largely neutralize each other. The final score is highest for neutral, so the output Health Sentiment for this document is the neutral label. As in the previous case, the estimated probability for the winning response is less than 50%.

FIG. 11 depicts the n-grams of the document that have values in the Legal Sentiment model. The Legal Sentiment model captures the status of an individual regarding any involvement as the subject of criminal law proceedings: This is neutral if the individual is involved in no criminal law proceedings; or, negative if the individual is involved in such proceedings. Generally, criminal law proceedings do not reward an individual; an acquittal returns the individual to the legal status prior to proceedings. Therefore, the legal sentiment model includes only two classifications—negative and neutral—and does not contain a positive classification. The probabilities for each of the two classifications are $p_{negative}$=0.67 and $p_{neutral}$=0.33. In the Legal dimension, as in the Ethical and Health dimensions, features relating to "arrest" vote for the negative sentiment label. The features for "right" and "thing" vote for the other possible response, neutral. However, the cumulative 22.8 points for negative due to "arrest" easily overpower the smaller positive votes for neutral, and so this sentence is evaluated as Legal negative. Because there are only two categories, the winner must have an estimated probability over 50%, but here the confidence happens to be relatively high, 67%.

Rule-Based Approach

The following are sample inputs and outputs of applying rules to classify the same document in multiple dimensions:

Input document: "ACME Motors is a rip-off! Their expensive cars are lemons that break all the time."

Output in "Malfunction" Dimension using rules specified above: Negative.

Output in "Value" Dimension using rules specified above: Negative.

Example Application—Review Site Monitoring for Specific Types of Businesses

As mentioned above, in some embodiments documents are evaluated across all known dimensions. Documents can also be evaluated across dimensions most likely to be of interest to the entity requesting the analysis. For example, suppose platform 114 offers a reputation monitoring service for various businesses. Representatives of those businesses register for an account on platform 114 and direct the platform to monitor review site 118 for postings by customers of their respective businesses. The businesses can customize, through interface 112, which dimensions of sentiment they wish to receive reports about from reporting engine 218. In some embodiments the representatives select the dimensions. In other embodiments, representatives receive recommendations of which dimensions are likely to be of most interest (or are not given the opportunity to customize the dimensions but instead receive sentiment analysis with respect to those dimensions selected by platform 114 or an operator of platform 114).

Depicted in FIG. 12 are five example types of businesses: a doctor's office in a Health Maintenance Organization (HMO), a restaurant, a new automobile dealer, an automobile repair shop, and a retail website (1202). Three dimensions in which reviews submitted to review site 118 can be analyzed for sentiment are listed as columns 1204, 1206, and 1208. Specifically, the dimensions are the Malfunction dimension, the Value dimension, and the Politeness dimension. The following summarizes the likely interest of sentiments expressed in the various dimensions to the various businesses:

The Doctor's Office in an HMO

In this case, Malfunction sentiment is unlikely to be of interest, because medical care does not often suffer from mechanical failures. Because it is in an HMO, the patient is not directly aware of costs. Moreover, medical care is often considered essential at any price, so the Value sentiment is also not likely of interest. Politeness sentiment, however, is of considerable attention, in how the medical caregivers and staff interact with the patient, so it is the only of the three dimensions listed in FIG. 12 which would be of significant interest to the business.

The Restaurant

Malfunction sentiment is unlikely to be of interest. Reviews expressing both Value sentiment and Politeness Sentiment are likely to be of high interest to the restaurant.

The Automobile Dealer that Only Sells New Cars

Here, Malfunction sentiment is likely to be of high interest: a new car with mechanical problems is a serious breach of the business proposition. Value and Politeness are also of interest, so all three of the example dimensions are likely to be of interest.

The Automobile Repair Shop

Here, reviews will frequently mention the mechanical flaw(s) that led to the customer seeking a repair. Therefore, sentiment expressed in the Malfunction dimension is not likely to be of interest. Value and Politeness are both of interest, however.

The Online Retail Website

Here, the Malfunction sentiment is of interest, because a website's use can be impaired by lapses in function. Value is also of interest, because customers will desire good prices on the merchandise. Politeness is not likely to be relevant, unless the site has something like a "live chat feature," because there is otherwise no human interaction between shoppers and representatives of the retail website.

Analysis of the Same Document Using Different Profiles

The five businesses have four different profiles of dimensions likely to be of interest. The seemingly-different restaurant and automobile repair shop have the same profile. The seemingly-similar new automobile dealer and automobile repair shop have different profiles.

Suppose the following statement was identically made in both a review of the new automobile dealer and the automobile repair shop: "I found out that my car doesn't work because a cylinder is cracked." The text has neutral sentiment for the Value and Politeness dimensions, but negative sentiment for the Malfunction dimension. As a result, it is labeled as negative for a new auto dealer, reflecting that the customer has bought a car that does not work and is unhappy. If the automobile dealer requested alerts when negative reviews were posted to site 118, the automobile dealer would receive an alert from reporting engine 218 when platform 114 evaluates the review for the automobile dealer. For an automobile repair shop, however, the review is rated neutral in the only relevant dimensions, Value and Politeness, reflecting that the problem named is probably the reason the customer arrived at the shop, not a fault counted against them. Accordingly, if the automobile repair shop also had requested to be notified by platform 114 when negative reviews were posted to site 118, the automobile repair shop would not receive an alert in response to the posting of the identical review.

As another example, the statement, "You gotta watch it!" when evaluated using a Malfunction model on behalf of an automobile repair shop may result in a negative sentiment label with a high confidence. The verbatim statement when evaluated using an Entertainment model on behalf of a television network may result in a positive sentiment label with high confidence.

Hierarchical Dimensions

In some embodiments, very specific sets of dimensions are used for various types of businesses. For example, in addition to a general Malfunction sentiment, sub-dimensions such as Automobile Malfunction sentiment and Website Malfunction sentiment are trained and used in classifying sentiment. Profiles for other types of businesses (e.g., as classified using the North American Industry Classification System) can be constructed in a manner similar to the profiles shown in FIG. 12, using various distinct dimensions. Some dimensions, such as weather, climate, etc. may not reflect directly on a business, but nonetheless be of interest (e.g., when evaluating hotel reviews for the suitability of the hotel's location) or for other purposes.

Example Application—Media/Reputation Monitoring Service for Individuals

Individuals (or their public relations representatives) can also subscribe to media/reputation monitoring services provided by platform 114 or can perform on-demand searches for documents. Platform 114 can also perform sentiment analysis regarding individuals on behalf of third parties, such as potential employers, described in more detail below.

Some dimensions are unlikely to be of interest to any individuals (such as "Value" and "Malfunction"). Some dimensions are likely to be of interest to all individuals (such as "Business"). Finally, some dimensions may be of interest to some individuals but not to others. As an example, a politician may be very concerned about news articles that express negative sentiment in the Personal and/or Vice dimensions. A rock musician may not be concerned about such dimensions or may even be attempting to cultivate a reputation as having vices. Accordingly, the politician may desire to receive alerts regarding sentiments expressed in different dimensions than those of interest to the rock musician.

Yet another example dimension is a Personality dimension, in which a negative personality indicates the individual is boring and a positive personality indicates the individual is entertaining. For some individuals, such as podiatrists, a negative Personality label may be of little interest. For other individuals, such as talk-show hosts, documents expressing negative Personality sentiment may be of very significant interest.

Example Application—Job Candidate Review

Suppose a hospital is conducting a search for a new specialist surgeon and that three candidates have applied. As part of the hiring process, the hospital could use platform 114 to conduct searches (e.g., of data sources 116-122) for documents mentioning each of the candidates. One of the candidates may be very well regarded for his fundraising efforts and for his contributions to charity, but have only a lukewarm reputation for successfully operating on patients. Another one of the candidates may have a very negative reputation with respect to his personal life (e.g., involved in a bitter custody dispute; having embarrassing interactions with relatives), be rude to patients, but also have a stellar track record with saving patient lives. Using the techniques described herein (and, for example, selecting which dimensions to evaluate candidates for), the hospital can pick the best surgeon (or the least embarrassing future employee) as desired.

Figure 13:
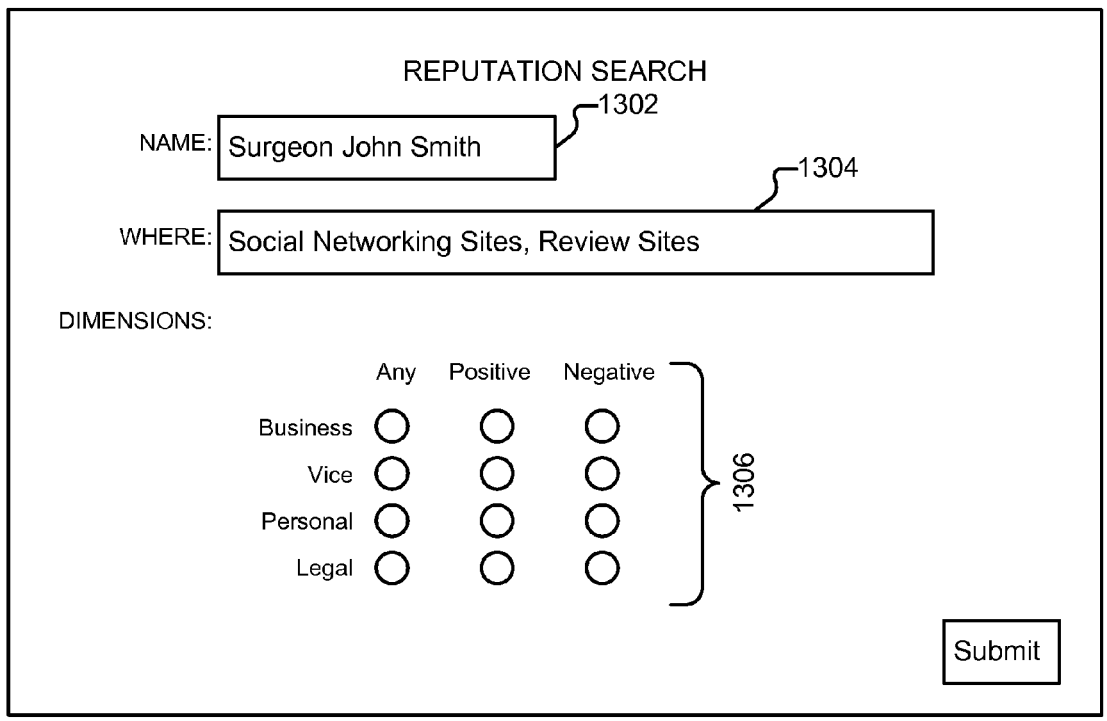
FIG. 13 illustrates an embodiment of an interface.

An example of an interface usable by the hospital is depicted in FIG. 13. In some embodiments interface 1300 is made available by platform 114. The hospital hiring committee can enter the name of a prospective candidate into field 1302. In field 1304, the hiring committee can enter the location(s) to be searched for documents pertaining to the candidate. In region 1306, the committee can enter which dimensions are of interest, and also indicate whether they are interested in documents that express negative, positive, or any sentiment with respect to those dimensions.

The interface shown in FIG. 13 can also be used by the surgeon himself (e.g., prior to applying for the job, so that he is prepared for any uncomfortable interview questions) or by an entity such as a public relations expert or agent to help mitigate any problematic documents. In some embodiments, after an initial search is done (e.g., across all dimensions), the user is given the option to filter results based on only those dimensions with negative or positive scores exceeding a threshold. For example, if documents regarding a particular individual express sentiment with respect to only a handful of dimensions, after performing an initial search that identifies those dimensions, the user can be offered the ability to explore specific dimensions of likely interest.

Example Application—Unprofessional Speech Detector

One example dimension is an Unprofessional Speech dimension. A model can be trained for such a dimension by asking users to indicate whether sample text appears professional or not. Examples of unprofessional speech can include slang, misspelled words, expletives, etc. A rule-based approach can also be used to define how text should be evaluated in the dimension.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing detailed sentiment analysis, comprising:
   a processor configured to:
      analyze a first portion of text included in a content source to generate a first sentiment score for a first entity on a first dimension
      analyze a second portion of text included in the content source to generate a second sentiment score for the first entity on a second dimension, wherein the first and second portions of text are at least partially overlapping; and
   a memory coupled to the processor and configured to provide the processor with instructions.

2. The system of claim 1 further comprising an interface configured to receive the content source.

3. The system of claim 1 wherein the content source comprises at least one result of performing a search for the first entity in a search engine.

4. The system of claim 1 wherein the processor is further configured to aggregate the first and second sentiment score.

5. The system of claim 1 wherein the processor is further configured to generate a third sentiment score for the first entity on a third dimension based on the content source.

6. The system of claim 1 wherein the processor is further configured to determine a relevance of the first dimension to the content source.

7. The system of claim 6 wherein determining the relevance comprises applying a threshold.

8. The system of claim 1 wherein the content source comprises content obtained from a third party review site.

9. The system of claim 1 wherein generating the first sentiment score comprises using a machine learning model.

10. The system of claim 1 wherein generating the first sentiment score comprises applying a rule-based model.

11. The system of claim 1 wherein the processor is further configured to recommend as likely to be of interest to the first entity at least one of the first dimension and the second dimension.

12. The system of claim 1 further comprising an interface configured to receive a selection of at least one of the first dimension and the second dimension from a user.

13. The system of claim 1 wherein the first dimension comprises an unprofessional language dimension.

14. The system of claim 1 wherein the first dimension comprises an ethics dimension.

15. The system of claim 1 wherein the first dimension comprises a customer service dimension.

16. The system of claim 1 wherein the first dimension and second dimension are organized within a dimension hierarchy.

17. A method of performing detailed sentiment analysis, comprising:
   analyzing, by a processor, a first portion of text included in a content source to generate a first sentiment score for a first entity on a first dimension; and
   analyzing a second portion of text included in the content source to generate a second sentiment score for the first entity on a second dimension, wherein the first and second portions of text are at least partially overlapping.

18. The method of claim 17, further comprising aggregating the first and second sentiment score.

19. The method of claim 17, further comprising generating a third sentiment score for the first entity on a third dimension based on the content source.

20. A computer program product for performing detailed sentiment analysis, the computer program product being embodied in a tangible and non-transitory computer readable storage medium and comprising computer instructions for:
   analyzing a first portion of text included in a content source to generate a first sentiment score for a first entity on a first dimension; and
   analyzing a second portion of text included in the content source to generate a second sentiment score for the first entity on a second dimension, wherein the first and second portions of text are at least partially overlapping.

* * * * *